(12) United States Patent
Otto

(10) Patent No.: US 10,293,398 B2
(45) Date of Patent: May 21, 2019

(54) FORMING MACHINE, IN PARTICULAR A FORGING HAMMER

(71) Applicant: Langenstein & Schemann GmbH, Coburg (DE)

(72) Inventor: Markus Otto, Lautertal (DE)

(73) Assignee: Langenstein & Schemann GmbH, Coburg (DE)

( * ) Notice: Subject to any disclaimer, the term of this patent is extended or adjusted under 35 U.S.C. 154(b) by 0 days.

(21) Appl. No.: 15/765,985

(22) PCT Filed: Sep. 12, 2016

(86) PCT No.: PCT/EP2016/071456
§ 371 (c)(1),
(2) Date: Apr. 4, 2018

(87) PCT Pub. No.: WO2017/060045
PCT Pub. Date: Apr. 13, 2017

(65) Prior Publication Data
US 2018/0297105 A1    Oct. 18, 2018

(30) Foreign Application Priority Data

Oct. 5, 2015   (DE) .................. 10 2015 116 881

(51) Int. Cl.
| | |
|---|---|
| *H02K 41/00* | (2006.01) |
| *H02P 1/00* | (2006.01) |
| *H02P 3/00* | (2006.01) |
| *H02P 5/00* | (2016.01) |
| *B21J 7/30* | (2006.01) |
| *H02K 41/03* | (2006.01) |
| *H02K 7/14* | (2006.01) |

(52) U.S. Cl.
CPC .............. *B21J 7/30* (2013.01); *H02K 41/031* (2013.01); *H02K 7/14* (2013.01); *H02K 2213/03* (2013.01)

(58) Field of Classification Search
CPC ................................ B21J 7/30; H02K 41/031
USPC ....................................................... 318/135
See application file for complete search history.

(56) References Cited

FOREIGN PATENT DOCUMENTS

DE         3127893 A1    2/1983

*Primary Examiner* — Erick D Glass
(74) *Attorney, Agent, or Firm* — Workman Nydegger

(57) ABSTRACT

The underlying invention relates in particular to a forming machine, having an electromagnetic linear motor with a linear mover and multiple coil units each with a predetermined coil pole pitch (S) which is measured in the direction of the movement axis. The linear mover includes, in an alternating arrangement along the longitudinal axis (L) thereof, first permanent magnets which are magnetized transversely to the longitudinal axis with a predetermined first magnetic pitch (T1) and second permanent magnets which are magnetized in the direction of the longitudinal axis (L) with a predetermined second magnetic pitch (T2), wherein a ratio of coil width (S) to first magnetic pitch (T1) is 3:1, and wherein a ratio of first magnetic pitch (T1) to second magnetic pitch (T2) is 2:1.

19 Claims, 6 Drawing Sheets

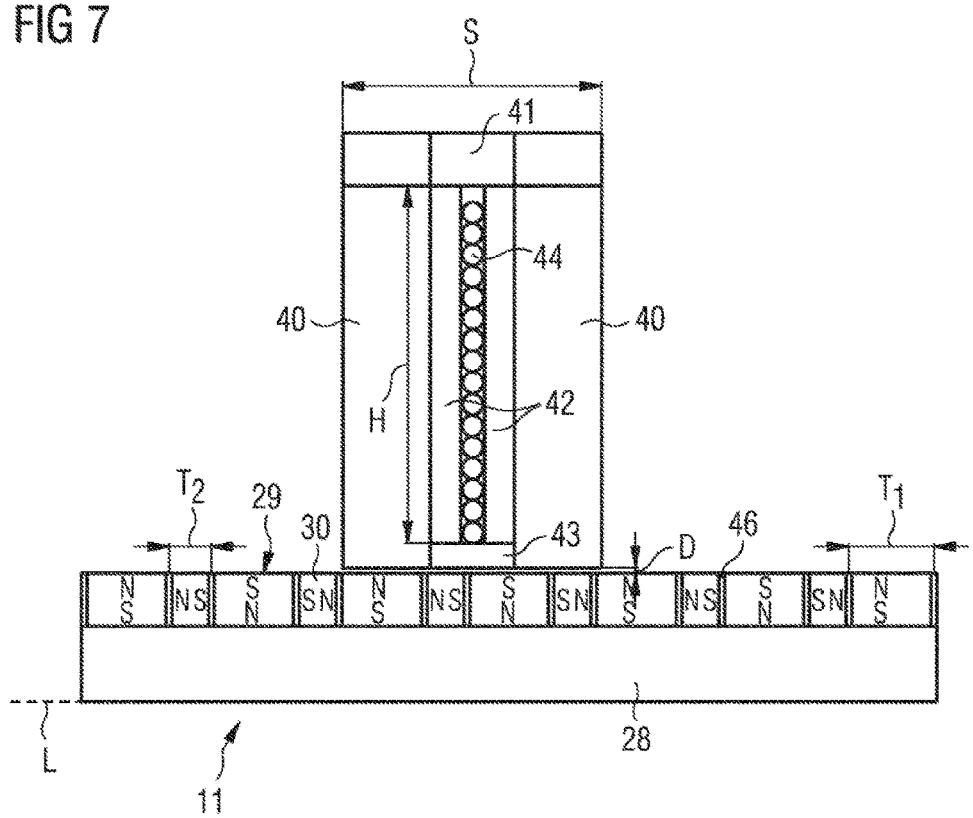

FORMING MACHINE, IN PARTICULAR A FORGING HAMMER

CROSS-REFERENCE TO RELATED APPLICATIONS

The present invention is a 35 U.S.C. § 371 U.S. National Stage Application corresponding to PCT Application no. PCT/EP2016/071456, filed on Sep. 12, 2016, which claims the benefit of priority to German Patent Application No. DE 10 2015 116 881.2 filed Oct. 5, 2015. The entire content of each of the aforementioned patent applications is incorporated herein by reference.

BACKGROUND OF THE INVENTION

1. Field of the Invention

The underlying invention relates to a forming machine, in particular to a forging hammer, having an electromagnetic linear motor.

2. Background

A forging hammer with linear drive is disclosed, for example, in DE 20 2008 018 169 U1. In the case of the known forging hammer, a hammer head is realized as a linear mover of a linear motor and comprises magnets or secondary parts mounted thereon which, together with the hammer head, are received in a stationary primary part so as to be longitudinally displaceable. To carry out forging movements, the hammer head, which is realized as a linear mover, is moved up and down by operating the linear motor correspondingly such that forging operations are able to be carried out at the bottom of the downward movement.

BRIEF SUMMARY OF THE INVENTION

The known forging hammer in the sense of a forming machine definitely leaves room for improvements with regard to configuration and design of the linear drive, in particular of the linear motor.

U.S. Pat. No. 6,313,551 B1 discloses, for a linear motor, a magnetic arrangement for a shaft along which a mover of the linear motor is able to move. The magnetic arrangement includes magnets which are arranged one behind the other in the axial direction of the shaft and are magnetized either axially or transversely with reference to the axial direction.

In this respect, an object of the present invention can be seen to be the further development, with regard to the linear drive, of known forming machines, in particular forging hammers, with electromagnetic linear drives. In particular, a forming machine or forging hammer with an alternative and/or improved electromagnetic linear drive is to be specified.

Said object is achieved according to the invention, in particular, by a forming machine with the features according to claim 1. Further solutions, configurations and variants of the invention are produced, in particular, from the dependent claims and from the following description of exemplary configurations and exemplary embodiments.

Provided in the configuration according to claim 1 is a forming machine, for example in the form of a forging hammer, which is realized for forming workpieces, for example metal workpieces or semi-finished products.

The forming machine includes an electromagnetic linear motor which is designed to drive a die, e.g. a forming tool in the form, for example, of a hammer head and is fixed, for example, on a frame.

A linear motor is to be understood, in particular, as a linear drive which includes a stator and a linear mover which is mounted so as to be longitudinally displaceable in the stator, a drive of the linear mover being effected on the basis of electromagnetic interaction between the stator and the linear mover. Linear motors of this type can be realized, for example, as solenoid linear motors.

The linear motor includes multiple or a plurality of coil units which are arranged one behind another along a movement axis of a linear mover and define a mover space for the linear mover. Preferably, the coil units are of identical design and, taken together, can realize the stator of the linear motor.

Each coil unit can include one or multiple coils, in particular cylinder coils, coil windings or part-coils. Preferably, the cylinder coils comprise a small axial length compared to the diameter of the cylinder coil. For example, with a coil diameter of 480 mm, the axial length of the cylinder coils can be within the range of between 20 mm and 40 mm. In preferred manner, the coil windings of every coil unit wrap around the mover space, in particular in an arrangement which is symmetrical to the mover space.

The coil units can be arranged such that the pole surfaces thereof, or the pole surfaces of the respectively associated coils are aligned transversely, in particular perpendicularly to the movement axis of the linear mover, or the longitudinal axis of the mover space.

A volume, which is spanned by the coil unit/units, in which the linear mover is able to move in a collision-free manner relative to the coil units and in which the linear mover is able to carry out linear movements controlled by electromagnetic fields, is to be understood, in particular, as the mover space.

The mover space can be realized, in particular, in the form of a cylinder volume which is surrounded or wrapped around at least in portions in the direction of the cylinder axis by coil windings of the coil units. In configurations, the coil units, in particular the coil windings can be realized in a rotationally symmetrical manner to the mover space.

Preferably, the coil unit/units is/are designed such that center points of the coil windings, centers of the surfaces of the coil winding surfaces or surface centers of the pole surfaces of the coil unit and/or of the coils are located along a movement axis of the linear mover. For example, the coil windings can be arranged such that coil axes of the coil windings, or normal axes of the pole surfaces can extend in a colinear manner to the movement axis of the linear mover, i.e. are substantially colinear to one another. However, it is also possible for the coil axes or normal axes to be tilted in relation to the movement axis of the linear mover.

The movement axis of the linear mover is to be understood, in particular, as an axis which extends through the mover space and is colinear to the movement trajectory of the center of the volume, surface or mass of the linear mover which is generated during correct operation of the linear motor. In particular, the axis, along which the linear mover, more precisely a center of a volume, surface or mass of the linear mover, is able to move when the linear motor moves in the mover space during correct motor operation, can be understood as the movement axis.

The coil units of the linear motor can be viewed as a primary part with a mover space, inside which the linear mover, as a secondary part, is able to move in a linear movement parallel to the movement axis.

The coil units comprise a predetermined coil pole pitch in the direction of the movement axis. Preferably, the coil pole pitch is identical for all the coil units.

The coil pole pitch of a coil unit is to be understood, in particular, as the distance between poles or the distance between pole surfaces, of the coil unit, measured in the axial direction of a coil unit, in particular in a normal direction of the pole surfaces of the coil unit.

If a coil unit includes one or multiple coils, and, where applicable, magnetic field-conducting elements or cores which are arranged on the coils or are coupled therewith, the coil pole pitch is thus to be understood, in particular, as the distance between poles of the system formed by the coil/coils and the cores measured in the axial direction of the coil unit, in particular in a normal direction of the coil surfaces. The coil pole pitch can be identical or substantially the same size as an axial length of a coil unit measured in the direction of the movement axis.

As already mentioned, the coil unit can include one or multiple coils or coil windings and, where applicable, magnetic field-conducting elements or cores or core elements or core segments which are connected to the coil or the coils or coil windings.

The cores can be arranged, for example, directly adjacent to the coil or coil winding in the axial direction, i.e. in the direction of the coil axis, such that exit fields of the magnetic field lines are facing the mover space.

Cores, which are arranged on one or both sides of a coil winding and are aligned and attached radially with reference to the movement axis, can be present, for example, in a direction parallel to the movement axis.

Preferably, the cores are arranged symmetrically with reference to the movement axis and/or with reference to a transversal center plane of the respective coil unit, the cores being able to be realized and arranged, in particular, such that they conduct or steer the magnetic field generated by the coil/coils in an optimum manner into the mover space.

In configurations, the cores or core elements can be realized in the form of or in the manner of cut tape-wound cores or cut tape-wound core elements.

The linear mover according to the configuration according to claim 1 includes, in an alternating arrangement along the longitudinal axis thereof, on the one hand, first permanent magnets which are magnetized transversely to the longitudinal axis with a predetermined first magnetic pitch (T1), and, on the other hand, second permanent magnets which are magnetized parallel to the longitudinal axis with a predetermined second magnetic pitch (T2). The permanent magnets can be, in particular, ring magnets. Preferably, the permanent magnets are arranged directly one behind another in the direction of the longitudinal axis, where applicable with the interposition of spacer elements which are realized, for example, to compensate for manufacturing tolerances.

The longitudinal axis is to be understood, in particular, as the axis of the linear mover which, during operation of the linear motor, is colinear to the movement axis or coincides with said movement axis.

First permanent magnets being magnetized transversely to the longitudinal axis is to be understood, in particular, as corresponding first permanent magnets being realized and arranged such that their direction of magnetization, in particular from south pole to north pole, extends transversely to the longitudinal axis of the linear mover. In particular, the direction of magnetization can extend perpendicularly to the longitudinal axis. In the event of a rotationally symmetrical linear mover, the direction of magnetization can be aligned, for example, radially to the longitudinal axis of the linear mover.

Accordingly, second permanent magnets being magnetized in the direction of the longitudinal axis are to be understood, in particular, as corresponding second permanent magnets being realized and arranged such that their direction of magnetization, in particular from south pole to north pole, extends in the direction of the longitudinal axis of the linear mover. In particular, the direction of magnetization can extend parallel or substantially parallel to the longitudinal axis, i.e. in or substantially in the axial direction of the linear mover.

The term first magnetic pitch which is applicable to the first permanent magnets is to be understood, in particular, as the width of a first permanent magnet measured in the direction of the longitudinal axis, where applicable including the proportionate width of spacer elements between the first and second permanent magnets. The first magnetic pitch can correspond, for example, to the sum of the axial lengths of a first permanent magnet and of a possible proportion of a space which is present between a first and a directly adjacent second permanent magnet.

The term second magnetic pitch which is applicable to the second permanent magnets is to be understood, in particular, as the width of a second permanent magnet measured in the direction of the longitudinal axis, where applicable including the proportionate width of spacer elements between the first and second permanent magnets. The second magnetic pitch can correspond, for example, to the sum of the axial lengths of a second permanent magnet and of a possible proportion of a space which is present between a first and a directly adjacent second permanent magnet.

In particular, the second magnetic pitch of a second permanent magnet can be identical to the magnetic pole pitch of the second permanent magnet, the magnetic pole pitch of the permanent magnet being understood, in particular, as the distance between poles, or distance between the pole surfaces, of the respective permanent magnet in the magnetic system of the linear mover measured in a normal direction of the pole surfaces of the permanent magnet.

When using the magnetic pole pitch of the second permanent magnet, the first magnetic pitch of a first permanent magnet can correspond to the distance, measured in the direction of the longitudinal axis, between pole surfaces of two directly adjacent second permanent magnets, which face the first permanent magnet. In other words, the first magnetic pitch of a first permanent magnet which is situated between two second permanent magnets can correspond to the distance between pole surfaces, which face one another, of the second permanent magnets.

The first magnetic pitch is preferably identical for all first permanent magnets, except for usual tolerances, and the second magnetic pitch is preferably identical for all second permanent magnets, except for usual tolerances.

In advantageous configurations, the linear mover can be realized and designed symmetrically with reference to the longitudinal axis of the linear mover as such, at least however as a magnetic portion defined by the permanent magnets. For example, the linear mover or the magnetic portion can comprise a cylindrical or piston-like design.

In the configuration according to claim 1, it is provided that a ratio, i.e. a quotient, of coil pole pitch (S) to a first magnetic pitch (T1) is approximately 3:1. In other words, the coil pole pitch (S) can be approximately three times the first magnetic pitch (T1).

It is further provided in the configuration according to claim 1 that a ratio, i.e. a quotient, of a first magnetic pitch (T1) to a second magnetic pitch (T2) is 2:1. In other words, the first magnetic pitch can be approximately twice the second magnetic pitch (T2).

The ratios of coil pole pitch, first magnetic pitch and second magnetic pitch described according to the preceding magnet arrangements or magnetic pole arrangements in conjunction with the invention have proved to be particularly advantageous in particular for forming machines, in particular forging hammers, in particular with regard to the forming energy and dynamics of the forming machine or forging hammer.

In configurations it can be provided that every coil unit includes at least one coil winding, i.e. one or multiple coil windings or part-coils, each coil winding being able to include two or multiple coil windings which are spaced from one another in the normal direction of the coil axis, in particular coil windings which are connected in series and/or in parallel.

A coil window height, which is measured transversely with respect to the movement direction or transversely with respect to the longitudinal direction of the linear mover, can be between 90 mm and 120 mm, or can be approximately 105 mm. The coil window height is to be understood, in particular, as a height of the coil winding measured transversely to the movement direction or transversely to the axial direction of the linear mover. The corresponding height can be determined in the case of, for example, a circular coil winding as the difference between the largest radius of the respective coil winding and the smallest radius of the respective coil winding. Formulated more generally, the coil window height can be understood as the height of the winding of the coil transversely to the coil axis.

In configurations it can be provided that a ratio between the coil pole pitch and the associated coil window height is between 3:2 and 2:1.

In configurations, for example in the case of linear hammers with a work capacity of approximately or equal to 25 kJ, an outside diameter of the permanent magnets, which is measured transversely, for example perpendicularly, to the longitudinal axis of the linear mover, can be between 90 mm and 110 mm. In variants, the outside diameter can be approximately 100 mm. The diameter can vary correspondingly to the respectively provided work capacity, and thus linear hammers with a work capacity greater than, for example, 25 kJ can comprise larger diameters, and linear hammers with a smaller work capacity can comprise smaller diameters or can be realized smaller in the corresponding dimensions.

In configurations, the coil body or coil bodies and the linear mover can be realized such that a distance realized between the outer extent of the linear mover and the inner extent of the coil body, in particular between the inner extent of a coil carrier or core of a coil body, is for example between 1.5 mm and 3 mm, for example is 2 mm. For example, preferred energy densities can be achieved with such configurations.

In other words, an air gap, which is formed between the linear mover, for example between the outer extent or the outer shell of the linear mover or of the permanent magnets and the coil units, in particular the inside diameter or the inside radius of a coil carrier or core in the mover space, measured transversely, in particular perpendicularly, to the longitudinal direction of the linear mover, can comprise a width of between 1.5 mm and 3 mm, in particular of approximately 2 mm. The air gap can be chosen, for example, in dependence on the diameter of the linear mover and/or of the coil body/bodies.

It can be provided in configurations that the permanent magnets comprise a coating on the outer extent thereof. The coating can be applied, for example, once the linear mover has been assembled, such that at least one outer shell or outer extent of the magnetic portion of the linear mover which is formed by the permanent magnets is covered by the coating. A resin compound can be used, in particular, as coating material.

It can be provided in configurations that at least one of the at least one coil unit includes cores, core elements or core segments, which are arranged in the direction of the movement axis or longitudinal axis of the linear mover, preferably in a symmetrical arrangement, and/or, preferably, on both sides of a coil winding or of a coil winding body of the coil unit. The cores, core elements or core segments can be aligned, for example, radially in the shape of a star or spoke, in particular in a rotationally symmetrical manner, with reference to the movement axis or longitudinal axis of the linear mover.

The cores, core elements or core segments can comprise, for example, a rectangular, in particular quadratic, cross section, and are realized, for example, in a cuboid manner.

The cores, core elements or core segments can abut against a respective coil winding by way of a longitudinal or transverse side.

Cores, core elements or core segments of the coil units can be coupled and attached together such that they comprise a U-shaped cross section, and that the magnetic field exit surfaces thereof are facing the mover space.

The cores can be realized in configurations as cut tape-wound cores or cut tape-wound core segments. The cores can be arranged, as previously mentioned, rotationally symmetrically to the movement axis or longitudinal axis of the linear mover. For example, directly adjacent cores or core elements can be arranged offset to one another at an angle of 45 degrees with respect to one another.

With the proposed configuration of the coil bodies, it is possible to design, in particular, a stator which is suitable for a forging hammer, with which stator particularly advantageous movement sequences and velocity curves are able to be achieved for forging and forming operations.

In configurations, for example for linear hammers with a work performance of approximately or within the range of 25 kJ, the cores can comprise a rectangular, in particular quadratic, cross section in planes which extend parallel to and through the movement axis, preferably with an edge length within the range of between 50 mm and 70 mm, in particular 60 mm. An outside diameter of the cores, which is measured with reference to movement axis, for example in the case of linear hammers with a work performance of approximately 25 kJ, can be between 570 mm and 610 mm, or approximately 600 mm. An inside diameter of the cores, for example in the case of linear hammers with a work performance of approximately 25 kJ, can be between 90 mm and 110 mm, or approximately 104 mm. Linear hammers with a greater or smaller work capacity can comprise correspondingly greater or smaller or correspondingly adapted dimensions or measurements, relating in particular to the aforementioned parameters such as the cross section, the edge length, the outside diameter and/or the inside diameter. This means, in particular, that the named dimensions and parameters can be adapted in dependence on the size, in particular on the work capacity.

In configurations, the linear motor can further include a cooling system which is realized for cooling coil windings of the coil units. The cooling system can be realized, for example, in a fluid-based manner, it being possible to use a liquid or gaseous fluid or combinations thereof as the cooling fluid.

In configurations, at least one of the coil windings can be coupled with a cooling channel, in particular a coolant channel, of the cooling system.

In configurations, the coolant channel can be realized as a wound, in particular helically wound, coolant line, which can be aligned parallel to the coil winding and thermally coupled with the coil winding. The coil winding and the coolant line winding can be mounted, for example, on a common winding carrier in configurations.

In configurations with a cooling system and corresponding cooling channels, at least one cooling channel or one coolant line winding of a coil unit can be axially and/or radially between coil part-windings with reference to the movement axis. For example, the cooling channel can be centered between radial and/or axial coil (part) windings, and each cooling channel being able to contact a coil winding or coil part-winding in a heat-conducting manner.

In configurations, a coil winding length of every coil winding, in particular the length of the wound coil wire, can be within the range of between 1000 m and 1500 m, or can be approximately 1300 m. In configurations of the invention, a wire diameter of the coil wire of at least one, preferably of all, coil windings can be within the range of between 1.6 mm and 2.0 mm, or can be approximately 1.8 mm. The named lengths and diameters can be different depending on the type and size of an associated forging hammer and can be adapted correspondingly to the respectively necessary forging performance or work performance.

In configurations, the number of coil units of the linear motor can be precisely three, or a whole multiple of three, for example precisely six. Such arrangements can be used, in particular, for the realization of a forging hammer, for example a short stroke forging hammer.

In configurations, a housing which encloses the linear motor at least in part can be additionally provided. For example, the housing can be realized such that the stator, the linear mover, parts of a cooling system and/or ventilation system for cooling and/or ventilating the coil units are received in the housing.

In configurations, it can be further provided that each of the coil units is mechanically coupled with at least one retaining ring, in particular a spacer ring, which, in turn, is fixed on a wall or a housing shell of the housing preferably by way of fastening lugs. A comparably simple fixing and fastening of the coil units can be achieved by way of such retaining or spacer rings.

A ventilation system, which is realized such that the coil units, in particular coil windings of the coil units, can be acted upon with a cooling air flow via openings in an outside wall of the housing, can be further provided in configurations. In configurations, the ventilation system can include an, i.e. at least one, active ventilator, such as, for example, a low-pressure ventilator. The at least one ventilator can be set up such that at least the coil units and/or coil windings can be acted upon with a cooling air flow in the housing.

In configurations, the housing can further include pressure compensating elements which are attached in or on the outside wall of the housing, or are integrated in said housing, such that pressure fluctuations which occur in the housing when the forming machine is in operation are compensable relative to the respective ambient. Pressure fluctuations can occur, for example, as a result of the linear mover being moved at least in part out of the housing and back again during operation. Stable operation of the linear motor can be achieved, in particular, as a result of corresponding pressure compensating elements.

A forming machine realized according to the underlying invention can be realized, for example in further configurations, or as a separately claimable forming machine such that it includes an electric linear motor with a linear mover which includes along its longitudinal axis first permanent magnets with a predetermined first magnetic pitch and preferably a magnetization which extends transversely relative to the longitudinal axis, and in an alternating arrangement with the first permanent magnets additionally second permanent magnets with a predetermined second magnetic pitch and preferably magnetization which extends parallel to the longitudinal axis. More precisely, the linear mover can comprise first and second permanent magnets in an alternating arrangement. The linear mover can be set up such that the first and second permanent magnets are realized as ring magnets and are fixed, in particular clamped, on a piston rod which reaches through the ring magnets.

The ring magnets can be threaded, for example, onto the piston rod with the interposition of spacer elements. The spacer elements can be, for example, shims, in particular laminated shims.

The ring magnets, and where applicable the spacer elements, can be clamped, for example by clamping nuts in the longitudinal direction of the piston rod.

The linear mover can comprise a sliding bearing portion on at least one axial end of said linear mover. The sliding bearing portion can include one or multiple sliding bodies, for example in the form of sliding or guide rings, which are connected one behind another in the longitudinal direction of the linear mover.

The forming machine can comprise a linear bearing or a linear bearing structure which is realized corresponding to the sliding bearing portion and through which the linear mover is guided during operation. The linear bearing can be realized on or in a frame of the forming machine and/or on or in a housing portion, for example in the form of a guide bush.

A fastening portion for the fastening of a forming tool or die can be realized on an axial end of the linear mover, for example directly connecting to a sliding bearing portion, the forming tool being able to be attached to a hammer head which is attached or fastened, for example, on the axial end of the linear mover, i.e. the piston rod. On an axial end of the linear mover remote from the fastening portion, said linear mover can include a stop nut, e.g. in an axially end position.

The linear mover can comprise, in configurations, for example a design where an axially end fastening portion, a sliding bearing portion, a magnetic portion formed from first and second permanent magnets and an axially end stop and/or clamping nut are arranged following one after the other in the axial direction.

The permanent magnets of the magnetic portion and sliding bearing components of the sliding bearing portion can be threaded on the piston rod and clamped together in the axial direction on the piston rod by way of axially end clamping nuts.

In configurations, the second permanent magnets can be arranged such that second permanent magnets, which follow one after the other in the direction of the longitudinal axis of the linear mover, are magnetized oppositely to one another in the direction of the longitudinal axis.

In configurations, the first permanent magnets can be arranged such that first permanent magnets, which follow one after the other in the direction of the longitudinal axis of the linear mover, are magnetized oppositely to one another radially to the longitudinal direction.

The linear mover can comprise, in configurations, for example an overall cylindrical form. Permanent magnets of the linear mover can be produced in configurations for example from a neodymium-iron-boron (NdFeB) material.

BRIEF DESCRIPTION OF THE DRAWINGS

Exemplary embodiments of the invention are described in more detail below by way of the accompanying figures, in which:

FIG. 7 shows a schematic cross-sectional representation of the arrangement of the permanent magnets and coils of the linear motor.

DETAILED DESCRIPTION OF THE PREFERRED EMBODIMENTS

Figure 1:
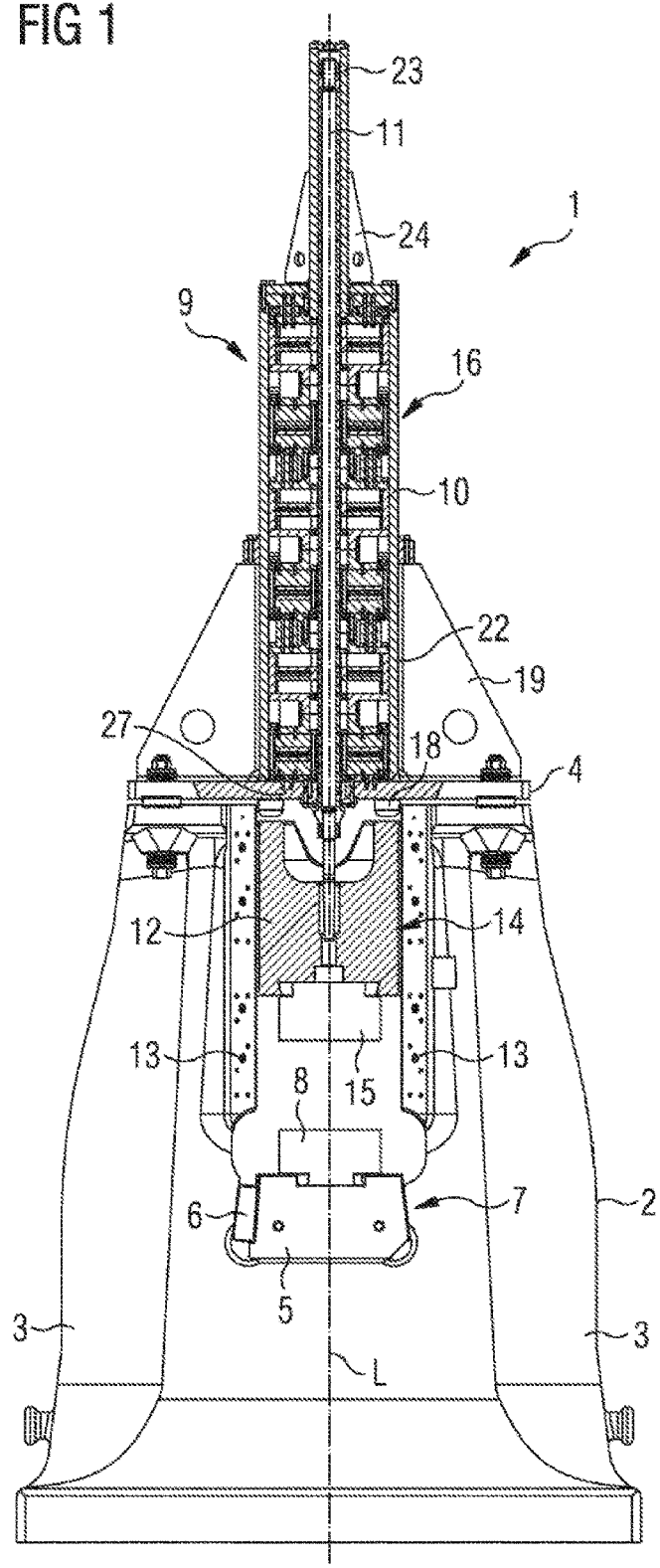
FIG. 1 shows a sectional representation of a forming machine.

FIG. 1 shows a perspective view of a forming machine 1 which is realized as an example as a forging hammer. The forging hammer 1 includes a hammer frame 2 with two lateral stands 3 for supporting a crosshead 4.

A forging hammer 1 as shown in FIG. 1 can include a lower insert 5 which can be fastened in the hammer frame 2 by means of an insert wedge 6, and a receiving means 7, with for example at least one fastening wedge, for a lower hammer die 8.

The forging hammer 1 further includes a linear motor 9, which is fastened and supported on the upper crosshead 4 and which can be, for example, a tubular solenoid linear motor 9, in particular a synchronous linear motor which is permanently excited by solenoid.

The linear motor 9, which is realized as an electric linear drive, includes a stator 10 and a linear mover 11 which is guided in the longitudinal direction therein.

The linear mover 11 is coupled with a head 12 which is guided, in turn, in two head guides 13 which are realized on the stands 3 such that the head 12 is able to be moved up and down by the electric linear motor 9.

On a side of the head 12 remote from the linear mover 11, said head includes a further receiving means 14, for example including at least one fastening wedge, with an upper hammer die 15 fastened thereon.

Figure 2:
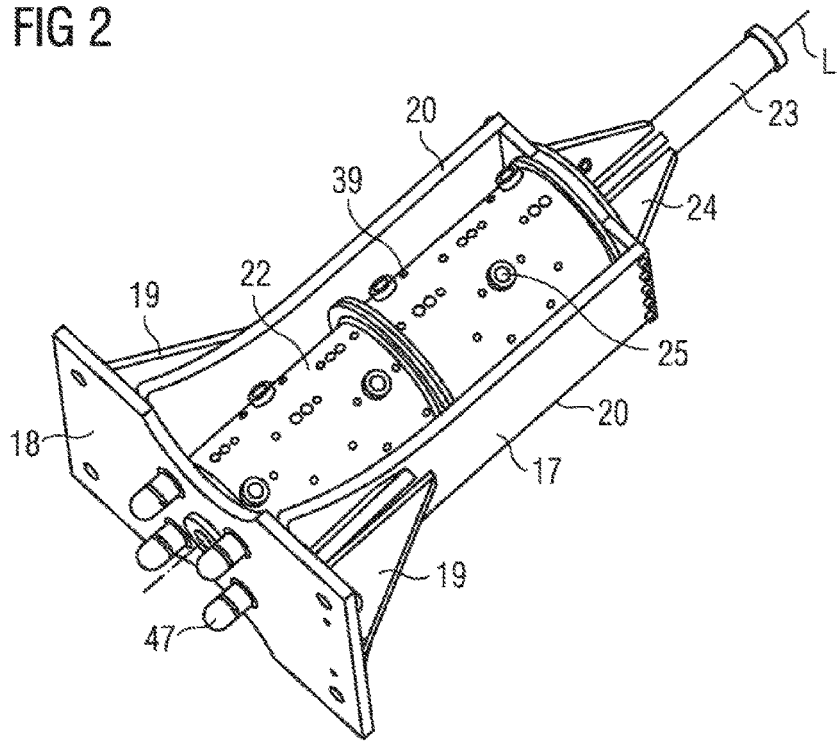
FIG. 2 shows a first perspective view of a linear motor of the forming machine.
Figure 3:
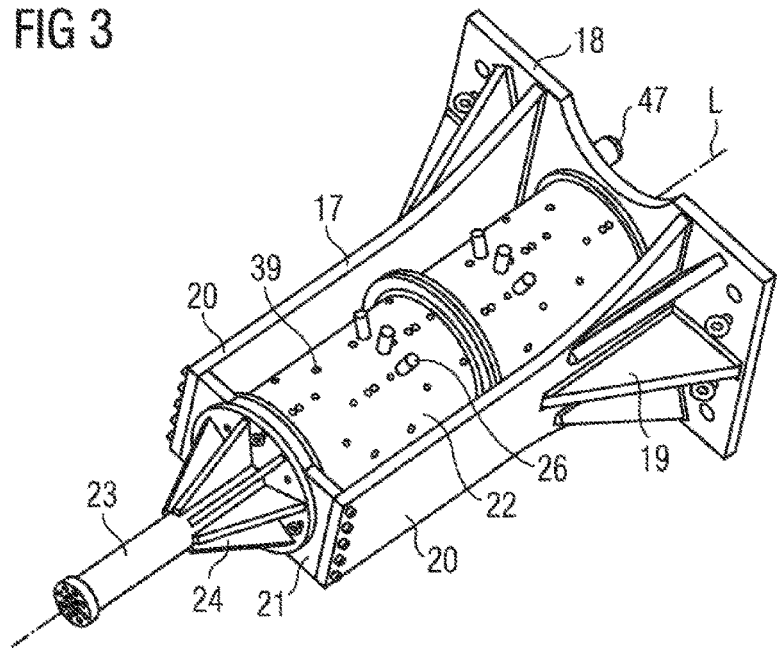
FIG. 3 shows a second perspective view of the linear motor.

The linear motor 9 is received in a housing 16 which is also shown in a perspective representation in FIGS. 2 and 3. The housing 16 comprises a modular design, and, in the example shown in FIGS. 2 and 3, includes a housing frame 17 with the crosshead 4 and side walls 20 which extend from the crosshead 4 and are supported mechanically by support angles 19 in relation to the crosshead 4. On a side remote from the crosshead 4, the side walls 20 are connected to a cover plate 21.

The housing frame 17 forms a supporting and carrying structure for a cylindrical housing shell 22 which is fastened and fixed thereon. The housing shell 22 can include, as shown in FIG. 2 and FIG. 3, multiple cylindrical housing shell segments, for example two housing shell segments as shown in FIG. 2 and FIG. 3. Depending on the size of the linear motor 9 and on the overall axial length, the number of housing shell segments can vary, and, for example, there can be just one single housing shell segment present. Housing shell segments can be connected together by means of flange connections, as indicated in FIG. 2 and FIG. 3.

The housing shell 22 is arranged between the crosshead 4 and the cover plate 21 and is mechanically connected to the housing frame 17. On the side of the cover plate 21 remote from the housing shell 22, the housing 16 includes a cylinder bush 23 which is supported on the cover plate by means of further support angles 24.

The cylinder bush 23 is realized as a linear bearing arrangement for the linear mover 9 such that the linear mover 9 is able to be mounted linearly therein for carrying out linear movements in the longitudinal direction of the cylinder bush 23, which can be seen, in particular, from the sectional representation in FIG. 1.

The cylinder bush 23 is arranged in alignment with and in the extension of a movement axis, running axis or guiding axis L of the linear motor 9, and is realized such that the linear mover 11 is guided in the longitudinal or axial direction thereof and is supported transversely to the longitudinal direction thereof.

A support bearing 27 (see FIG. 1) is present on a side of the linear motor 9, in particular of the housing 16, remote from the cover plate 21. The support bearing 27 is arranged in alignment with the longitudinal axis L and aligned with respect to the cylinder bush 23, and is realized and set up such that the linear mover 11 is guided in the longitudinal direction L therein, and is supported transversely to the longitudinal direction L.

Protection of the electronic components of the linear motor 9 against mechanical influences can be achieved as a result of the housing 16 being designed in a mechanically comparatively sturdy and closed manner.

Components which are accommodated in the housing 16 are comparatively simple to access as a result of the modular design of the housing 16, for example in the case of necessary maintenance work, where applicable.

The linear motor 9 is connected to the crosshead 4 on the lower frame of the forging hammer 1, in other words the stands 3. Specifically, the cross-head 4 is screw-connected to T-shaped stand heads of the stands 3. Positioning elements and/or dampers or absorber elements can be present between the crosshead 4 and the stand heads. The dampers or absorber elements can be designed to damp at least a transmission of mechanical impacts and/or oscillations from the lower frame to the housing 16 and consequently to the linear motor 9 which is connected to the housing 16.

As can be seen in FIG. 2 and FIG. 3, the housing shell 22 can include, for example, air intake nozzle 25 and air outlet elements with sound dampers 26. The air intake nozzle 25 and sound absorbers 26 enable pressure equalization in the housing 16 in order to be able to compensate, where applicable, for pressure fluctuations which occur in the housing 16 when the linear mover 11 moves up and down.

In the operation of the forging hammer 1, the head 12 is moved back and forth as a result of corresponding drive of the linear mover 11 by the stator 10 of the linear motor 9, moved up and down in the case of a vertical forming machine as shown, such that at a reversal point of the head 12, located remotely from the linear motor, forging operations are able to be carried out on workpieces (not shown).

Figure 4:
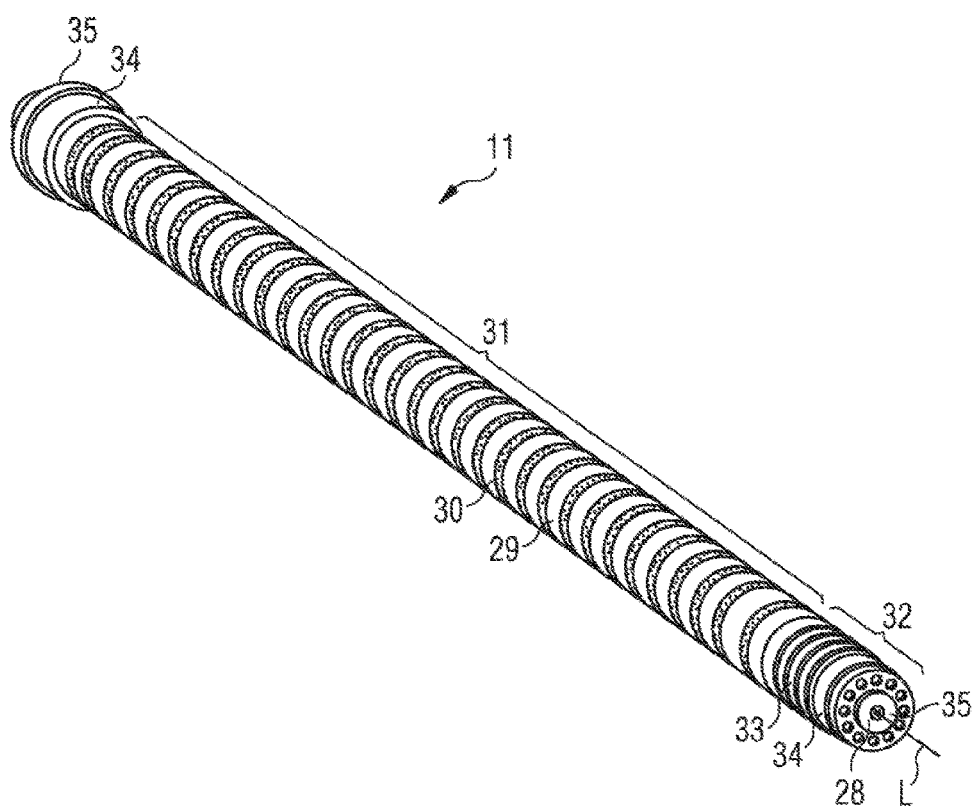
FIG. 4 shows a perspective view of the linear mover of the linear motor.

FIG. 4 shows the linear mover 11 of the linear motor 9 in detail. The linear mover 11 includes a piston rod 28, on which first permanent ring magnets 29 and second permanent ring magnets 30, i.e. permanent magnets 29, 30 realized in a ring-shaped manner, are threaded. The first and second permanent ring magnets 29, 30 are arranged in an alternating arrangement and form a magnetic portion 31 of the linear mover 11.

A bearing portion 32, which includes multiple ring bearing components 33, for example sliding rings, connects to the magnetic portion 31 of the linear mover 11 in the axial direction. The bearing portion 32 is realized such that it can be guided, for example, in the cylinder bush 23, the sliding rings, for example, being able to contact an inner sliding bearing surface of the cylinder bush 23.

Present between adjacent permanent magnets 29, 30 (not shown specifically in FIG. 4) are shims which can be realized, for example, as laminated shims such that the mutual distance between the permanent magnets 29, 30 is able to be adjusted corresponding to the respective requirements, it also being possible as a result of the shims to compensate for production-related variations in ring magnet geometries 29, 30.

The permanent magnets 29, 30, where applicable the shims, and the ring bearing components 33 are clamped on the piston rod 28 in the axial direction by means of stop nuts 34 and clamping nuts 35 which are provided axially on both sides of the piston rod 28.

Figure 5:
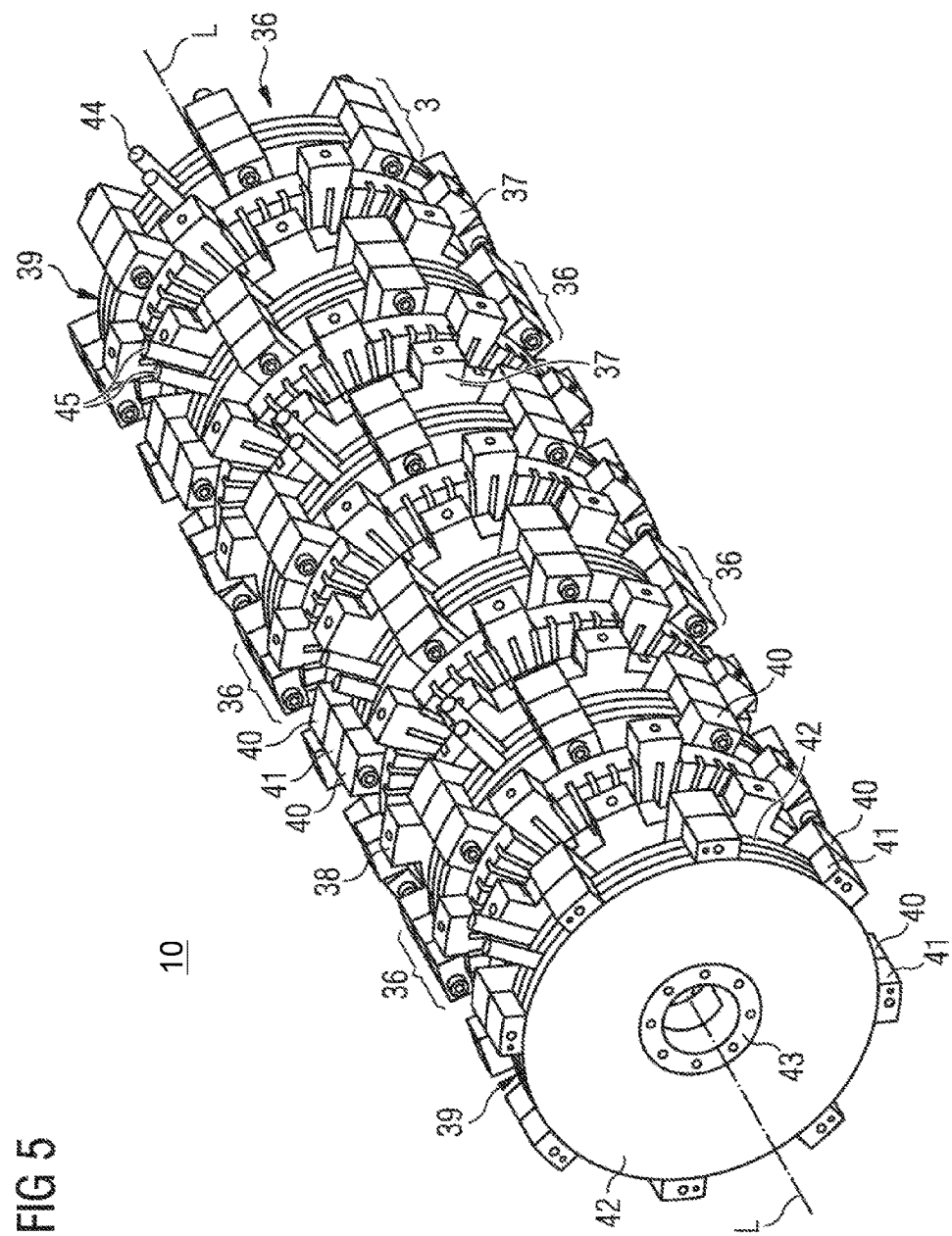
FIG. 5 shows a perspective view of the stator of the linear motor.

The linear mover 11, as shown FIG. 4, is realized in a cylindrical manner and comprises a length which is measured parallel to the longitudinal axis L and is longer than the length of the stator 10 which is measured parallel to the longitudinal axis and is shown more precisely in FIG. 5.

The stator 10 according to FIG. 5 is designed as a solenoid stator 10 in an overall cylindrical manner and comprises multiple coil units 36 which are arranged one behind another in the longitudinal direction L.

Each of the coil units 36 can be coupled with at least one spacer ring 37, by way of which positioning of the individual coil units 26 in the or on the housing shell 22 is made possible.

Preferably, the spacer rings 37 are arranged and realized such that a spacer ring 37 is present in each case on both sides of a coil unit 36 and thus each of the coil units 36 is able to be fixed parallel to the longitudinal direction L.

The spacer rings 37 include fastening lugs 38 which extend radially to the longitudinal direction L and are arranged distributed in the circumferential direction with reference to the longitudinal axis L. The fastening lugs 38 serve as stop elements for stopping against the inside wall, for example corresponding fastening interfaces of the housing shell 22.

The fastening lugs 38 include, in the present example, in each case a bore on the radially distal end face, which bore is realized such that the spacer rings 37 are able to be fixed in the housing shell 22, in particular on the inside wall of the housing shell, by means of fastening elements, such as e.g. screws 39 (see FIGS. 2, 3) which reach through the housing shell 22.

In the screw-connected state, the distal end face of the fastening lug 38 is pressed against the inside wall of the housing shell 22, whilst the screw 39, reaching through the housing shell 22, is supported on the outside wall of the housing shell 22.

The linear mover in FIG. 4 includes as an example a total of six coil units 36, the coil unit 36 placed at the front on the left in FIG. 4 only being shown in part for the purposes of illustration, and, as also the coil unit 36 placed at the back on the right, being coupled with just one spacer 36.

Figure 6:
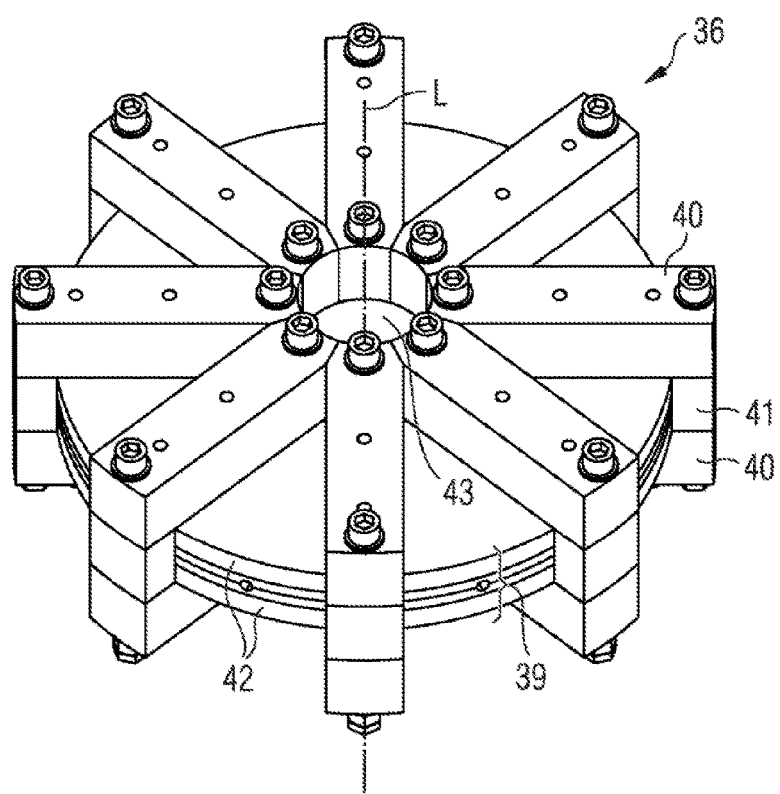
FIG. 6 shows a perspective view of a coil unit.

In the exemplary embodiment in FIG. 5, and corresponding configurations of the invention described herein, and as can also be seen from FIG. 6 which shows one single coil unit 36, each coil unit 36 includes a coil body 39 and, on both sides of the coil body 39, cut tape-wound cores 40 which are arranged and aligned in a star-shaped manner in the present case, are screw-connected together and in this way are connected to the coil body 39.

On radially outer ends with reference to the longitudinal axis L, the cut tape-wound cores 40 are screw-connected together by means of spacers 41, which bridge the coil body 39 parallel to the longitudinal axis L, such that a U-shaped core structure which is open on one side is produced, the magnetic field exit surfaces of which open out in the central passage opening of the coil unit 36. In the mounted state (cf. FIG. 5), the magnetic field exit surfaces open out into the mover space.

In the example of the figures, each coil unit 36 includes a total of 16 cut tape-wound cores 40, 8 cut tape-wound cores 40 being arranged in each case on each side of the coil body 39. The cut tape-wound cores 40 are arranged rotationally symmetrically to the longitudinal axis L, the cut tape-wound cores 40 being arranged offset to one another by an angle of 45° with reference to the longitudinal axis L.

The coil body 39 of the present configuration includes multiple, more precisely two, part-cores 42, which are realized as cylinder coils. Each cylinder coil includes at least one coil winding of coil wire which is fitted on a winding body 43.

Cut tape-wound cores 40, which are arranged in each case opposite one another in the direction of the longitudinal axis L with reference to the cylinder coils, are connected together by means of the spacers 41, on the one hand, and the winding body 43, on the other hand, and realize a core structure which encloses or engages over the coil windings at least in part.

In the example shown according to FIG. 5 and FIG. 6, the cylinder coils 42, or part-coils 42, of a coil unit 36 are spaced apart from one another parallel to the longitudinal axis L.

A cooling line 44, for example in the form of a cooling line winding (cf. FIG. 7), is realized in the space between the part-coils 42. FIG. 5 just shows associated cooling line ends 45 on the inflow and outflow side which are guided sideways, i.e. laterally with reference to the longitudinal axis, out of the coil unit 36 and can be connected to a corresponding cooling system (not shown).

As a result of the coil units 36 which are arranged one behind another along the longitudinal axis L and are in alignment with reference to the central passage opening of the coil units 36, in particular through the passage openings of the coil units 36, a mover space is defined in which the linear mover 11 is able to be moved.

To move the linear mover 11 in the stator 10, the coil units 36 are acted upon with current such that electromagnetic fields are generated which act on the first and second permanent magnets 29, 30 and thus cause the linear mover to move back and forth, to brake and/or to accelerate.

FIG. 7 shows a schematic cross-sectional representation of the permanent magnet arrangement and coil arrangement of the linear motor 9. A detail of the linear mover 11, specifically of the magnetic portion 31 of the linear mover 11, and a detail of the stator 10, specifically a detail of a coil unit 36 of the stator 10, are shown.

As can be seen in FIG. 7, the first permanent ring magnets 29 and the second permanent ring magnets 30 are threaded onto the piston rod 28, a shim 46 being present in each case between adjacent permanent ring magnets 29, 30, for tolerance compensation and/or for adaptation of the mutual distances between the permanent ring magnets 29, 30.

In the example shown in FIG. 7, the first permanent ring magnets 29 are magnetized radially with reference to the longitudinal axis L, which means, in particular, that the magnetic field direction is oriented radially in the interior of the first permanent ring magnets 29.

The second permanent ring magnets 30 are magnetized in the direction of the longitudinal axis L, which means, in particular, that the magnetic field direction is oriented in the interior of the second permanent ring magnets 30 parallel to the longitudinal direction, i.e. axially with reference to the piston rod.

In the example shown in FIG. 7, the first permanent ring magnets 29 are magnetized alternately radially outward and radially inward, i.e. in the direction of the piston rod 28. The second permanent ring magnets 30 are magnetized alternately oppositely to one another in the direction of the longitudinal axis L.

The first permanent ring magnets 29, which are arranged on the piston rod 28, comprise a first magnetic pitch T1 (substantially identical in each case) which corresponds to the sum of the width of a first permanent ring magnet 29 measured parallel to the longitudinal axis L and the width of the adjoining shim 46 measured parallel to the longitudinal axis L.

The second permanent ring magnets 30, which are arranged on the piston rod 28, comprise a second magnetic pitch T2 (substantially identical in each case) which corresponds to the sum of the width of a second permanent ring magnet 30 measured parallel to the longitudinal axis L and the width of the adjoining shim 46 measured parallel to the longitudinal axis L.

The second magnetic pitch T2 of a second permanent magnet 30 can correspond, in particular, to the magnetic pole pitch, i.e. to the, in particular effective, pole distance of the second permanent magnet 30 measured in the direction of the longitudinal axis L. By using the magnetic pole pitch of the second permanent ring magnet 30, the first magnetic pitch T1 of first permanent magnet 29 can correspond to the distance, measured in the direction of the longitudinal axis, between the pole surfaces of two directly adjacent second permanent magnets 30 facing the first permanent magnet 29.

The coil unit 36 includes, as already mentioned, the two part-coils 42 and the cooling line 44, which is arranged between the part-coils 42, which are arranged on the winding body 43. The cut tape-wound cores 40 are arranged, as already mentioned, on both sides of the coil body 39, which is realized by the two part-coils 42.

The coil unit 36 shown in FIG. 7 comprises a coil pole pitch S which is measured in the direction of the longitudinal axis L and corresponds to the distance, in particular effective distance, measured in the longitudinal direction L between the magnetic poles or pole surfaces of the coil unit 36.

The magnet and coil arrangement of the realization shown in FIG. 7 is such that the coil pole pitch S is (approximately) three times the first magnetic pitch T1 and that the first magnetic pitch T1 is (approximately) twice the second magnetic pitch T2.

In other words, a ratio of coil pole pitch S to first magnetic pitch T1 is 3:1, and a ratio of first magnetic pitch T1 to second magnetic pitch T2 is 2:1.

Such a magnet and coil arrangement has proved to be particularly advantageous in particular for use in forming machines, in particular percussive forming machines such as, for example, forging hammers.

The inside diameter of the coil units 36, i.e. the diameter of the central passage opening of the coil units 36 is chosen such that a predetermined air gap D is realized between the inside of the passage openings and the outside diameter of the linear mover 11. The size of the air gap can be, for example, approximately 2 mm, an outside diameter of the linear mover 11 in the magnetic portion 31 being able to be, for example, 100 mm, and an inside diameter of the winding body correspondingly 104 mm.

The coil pole pitch S can be, for example, 180 mm, the cooling channel with cooling line 44 being able to comprise a width of approximately 20 mm measured in the direction of the longitudinal axis L. The part-coils 42 can each comprise a width of approximately 20 mm in the direction of the longitudinal axis L, and the cut tape-wound cores 40 can have a width of approximately 60 mm.

The part-coils 42 can comprise, for example, an inside diameter of approximately 164 mm, it being possible to use a coil window height of approximately 100 mm or more such that the outside diameter of the part-coils 42 can be approximately 364 mm and more.

The linear mover 11 can comprise, on the end that faces the head 12, a piston rod continuation, to which the head 12 is able to be attached, for example by means of a wedge connection and the like. With the linear mover 11 in the retracted position, the piston rod continuation can extend, as can be seen in FIG. 1, between the support bearing 27 and the head 12. The piston rod continuation can include a fastening structure provided on the distal end and a decoupling structure.

The fastening structure can be realized in the form of a wedge or a conically tapered portion and can be connected in a positive locking manner, in particular in a friction locking manner, to the head 12 by means of a retaining bush in a corresponding recess or a through hole or blind hole in the head 12.

When the forging hammer 1 is operating, in the case of forging operations where the head 12 moves back and forth, or is moved up and down, for processing a workpiece and where the workpiece is formed at a reversal point of the head 12, the cylinder bush 23, the support bearing 27 and the decoupling structure interact together such that the linear mover 11 and the head 12 are decoupled with reference to relative movements of the head 12 in relation to the linear mover 11, and the linear mover 11 is guided correctly in the stator 10.

The magnetic portion 32 of the linear mover 11 can comprise a protective coating which, for example, can consist of an epoxy resin or can include an epoxy resin. The permanent magnets 29, 30 of the magnetic portion 32 can be protected, in particular, against external influences as a result of a corresponding coating.

The forming machine 1 can comprise a control means (not shown), by way of which at least the coil units 36 are able to be controlled such that the linear mover 11 can be moved back and forth, for example can be moved up and down, in the stator 10 and corresponding forging movements are able to be carried out with the head 12.

An interface of the stator 10 or of the housing 16 with which the linear motor 9 is fastened on the hammer frame 2, can be realized such that the linear drive, realized as described herein, is also able to be mounted, and fitted in retro, on forging hammers and other forming machines which already exist.

In order to avoid possible damage to the linear motor 9, in particular to the permanent ring magnets 29, 30 of the linear mover 11, or at least to suppress it largely, stop buffers 47 can be provided on an underside of the crosshead 4 of the housing 16, as shown in FIG. 2 and FIG. 3.

LIST OF REFERENCES

1 Forging hammer
2 Hammer frame
3 Stand
4 Crosshead
5 Insert
6 Insert wedge
7 Receiving means
8 Lower hammer die
9 Linear motor
10 Stator
11 Linear mover
12 Head
13 Head guide
14 Further receiving means
15 Upper hammer die
16 Housing
17 Housing frame
19 Support angle
20 Side wall
21 Cover plate
22 Housing shell
23 Cylinder bush
24 Further support angle
25 Air intake nozzle
26 Sound absorber
27 Support bearing
28 Piston rod
29 First permanent ring magnet
30 Second permanent ring magnet
31 Magnetic portion
32 Bearing portion
33 Ring bearing component
34 Stop nut
35 Clamping nut
36 Coil unit
37 Spacer ring
38 Fastening lug
39 Coil body
40 Cut tape-wound core
41 Spacer
42 Part-coil
43 Winding body
44 Cooling line
45 Cooling line ends
46 Shims
47 Stop buffer
L Longitudinal axis
T1 First magnetic pitch
T2 Second magnetic pitch
S Coil width
D Air gap
H Coil window height

I claim:

1. A forming machine, in particular a forging hammer, for forming workpieces, said forming machine comprising:
    an electromagnetic linear motor designed for driving a die, in particular hammer heads;
    wherein the linear motor comprises multiple coil units, which are arranged one behind another along a movement axis (L) of a linear mover, define a mover space and comprise in each case a predetermined coil pole pitch (S) in the direction of the movement axis (L);
    wherein the linear mover includes, in an alternating arrangement along the longitudinal axis (L) thereof:
        first permanent magnets which are magnetized transversely to the longitudinal axis (L) with a predetermined first magnetic pitch (T1), and
        second permanent magnets which are magnetized in the direction of the longitudinal axis (L) with a predetermined second magnetic pitch (T2);
    wherein a ratio of coil pole pitch (S) to first magnetic pitch (T1) is 3:1, and wherein a ratio of first magnetic pitch (T1) to second magnetic pitch (T2) is 2:1.

2. The forming machine as claimed in claim 1, wherein:
    every coil unit includes at least one coil winding, in particular multiple coil windings, preferably with a coil window height (H) which is measured transversely with respect to the movement direction and is between 90 mm and 120 mm, or is approximately 105 mm; and/or
    a ratio between coil pole pitch (S) and coil window height (H) is between 3:2 and 2:1.

3. The forming machine as claimed in claim 1, wherein:
    an outside diameter of the permanent magnets which is measured transversely, in particular perpendicularly, to the longitudinal axis (L) of the linear mover, is between 90 mm and 110 mm, or is approximately 100 mm; and
    the work performance of the forming machine preferably is approximately 25 kJ.

4. The forming machine as claimed in claim 1, wherein:
    the coil body and the linear mover are realized and arranged such that an air gap (D), which is formed in the mover space between the linear mover and the coil units, comprises a width transversely to the longitudinal direction (L) of between 1.5 mm and 3 mm, in particular is approximately 2 mm wide;
    the permanent magnets comprise a coating on the outer circumference thereof, in particular such that at least one outer shell or outer circumference of the magnetic portion of the linear mover, which is formed by the permanent magnets, is covered by the coating.

5. The forming machine as claimed in claim 1, wherein:
    the coil body and the linear mover are realized and arranged such that an air gap (D), which is formed in the mover space between the linear mover and the coil units, comprises a width transversely to the longitudinal direction (L) of between 1.5 mm and 3 mm, in particular is approximately 2 mm wide.

6. The forming machine as claimed in claim 1, wherein:
    the permanent magnets comprise a coating on the outer circumference thereof, in particular such that at least one outer shell or outer circumference of the magnetic portion of the linear mover, which is formed by the permanent magnets, is covered by the coating.

7. The forming machine as claimed in claim 1, wherein:
    at least one of the at least one coil unit includes cores, which are arranged on both sides of a coil winding of the coil unit in the direction of the movement axis (L), preferably aligned radially in the shape of a star with reference to the movement axis (L) and preferably realized as cut tape-wound cores;
    the cores preferably are arranged rotationally symmetrical to the movement axis (L), and wherein cores, which are directly adjacent in the circumferential direction, preferably are arranged offset to one at an angle of 45 degrees with respect to one another.

8. The forming machine as claimed in claim 7, wherein:
the cores comprise a rectangular, in particular quadratic, cross section in planes which extend parallel to and through the movement axis (L), preferably with an edge length within the range of between 50 mm and 70 mm, in particular 60 mm;
an outside diameter of the cores, which is measured with reference to movement axis (L), preferably is between 570 mm and 610 mm, or approximately 600 mm, and an inside diameter of the cores preferably is between 90 mm and 110 mm, or approximately 104 mm; and
the work performance of the forming machine preferably is approximately 25 kJ.

9. The forming machine as claimed in claim 1, wherein:
the linear motor further includes a cooling system which is realized for cooling coil windings of the coil units, wherein at least one of the coil windings preferably is coupled with a cooling channel, in particular a coolant channel, of the cooling system, preferably such that the cooling channel is between coil part-windings in the axial and/or radial direction with reference to the movement axis (L) and contacts the coil part-windings in a heat-conducting manner, wherein the cooling channel optionally is as a wound, in particular helically wound, coolant line, which is aligned parallel to the coil winding and is thermally coupled with the coil winding;
the coil winding and the coolant line winding optionally are mounted on a common winding carrier;
at least one cooling channel or one coolant line winding of a coil unit is/are axially and/or radially between coil part-windings with reference to the movement axis (L); and/or
the cooling channel optionally is centered between radial and/or axial coil windings or coil part-windings, and each cooling channel contacts a coil winding or coil part-winding in a heat-conducting manner.

10. The forming machine as claimed in claim 1, wherein:
a coil winding length of every coil winding is within the range of between 1000 m and 1500 m, or is approximately 1300 m; and/or
a wire diameter of a coil wire of at least one, preferably of all coil windings is within the range of between 1.6 mm and 2.0 mm, or is approximately 1.8 mm; and
the work performance of the forming machine preferably is approximately 25 kJ.

11. The forming machine as claimed in claim 1, wherein the number of coil units of the linear motor is precisely three, or is a whole multiple of three, in particular precisely six.

12. The forming machine as claimed in claim 1, further comprising:
a housing which encloses the linear motor at least in part; and
a ventilation system which is realized such that the coil units, in particular coil windings of the coil units, can be impinged with a cooling air flow via openings in an outside wall of the housing;
wherein the ventilation system preferably includes an active ventilator, in particular a low pressure ventilator, for generating the cooling air flow.

13. The forming machine as claimed in claim 12, wherein the housing further includes pressure compensating elements which are mounted in or on the outside wall of the housing, or are integrated in said housing, such that pressure fluctuations which occur in the housing when the forming machine is in operation are compensable relative to the respective ambient pressure.

14. The forming machine as claimed in claim 1, wherein each coil unit is mechanically coupled with at least one retaining ring, in particular a spacer ring, which in turn is fixed on a housing shell of the housing.

15. The forming machine as claimed in claim 1, wherein:
the permanent magnets are produced from a neodymium-iron-boron (NdFeB) material.

16. The forming machine in the form of a forging hammer, the forging hammer comprising:
the electric linear motor; and
the linear mover, wherein the linear mover includes along the longitudinal axis (L) thereof:
first permanent magnets with a predetermined first magnetic pitch (T1) and preferably a magnetization which extends transversely relative to the longitudinal axis (L), and
in an alternating arrangement with the first permanent magnets additionally second permanent magnets with a predetermined second magnetic pitch (T2) and preferably magnetization which extends parallel to the longitudinal axis wherein:
the first and second permanent magnets are realized as ring magnets, and are fixed, in particular clamped, on a piston rod which reaches through the ring magnets:
a hammer head, to which a forming tool is attached, is fastened on an axial end of the piston rod of the linear mover.

17. The forming machine as claimed in claim 16, wherein:
the ring magnets are threaded onto the piston rod with the interposition of spacer elements;
the spacer elements optionally are realized as shims; and
the ring magnets and the spacer elements further optionally are clamped by clamping nuts in the longitudinal direction of the piston rod.

18. The forming machine as claimed in claim 16, wherein:
the second permanent magnets, which follow one after another in the direction of the longitudinal axis (L), are magnetized oppositely to one another in the direction of the longitudinal axis (L); and/or
the first permanent magnets, which follow one after another in the direction of the longitudinal axis (L), are magnetized oppositely to one another radially to the longitudinal direction.

19. The forming machine as claimed in claim 16, wherein:
at least one axial end of the linear mover comprises a sliding bearing portion, wherein the sliding bearing portion optionally includes one or multiple sliding bodies, in particular in the form of sliding or guide rings, which are connected one behind another in the longitudinal direction of the linear mover;
wherein:
the forming machine comprises a linear bearing structure which is realized corresponding to the sliding bearing portion and through which the linear mover is guided during operation; and
on an axial end of the linear mover, in particular directly connecting to the sliding bearing portion, a fastening portion optionally is realized for the fastening of a forming tool or die.

* * * * *